J. P. GERAGHTY & G. W. NAYLOR.
CAR FENDER.
APPLICATION FILED JULY 24, 1911.

1,059,861.  Patented Apr. 22, 1913.

2 SHEETS—SHEET 1.

WITNESSES
William P. Goebel
Rud. G. Hostag

INVENTORS
John P. Geraghty
George W. Naylor
BY Munn & Co.
ATTORNEYS

J. P. GERAGHTY & G. W. NAYLOR.
CAR FENDER.
APPLICATION FILED JULY 24, 1911.
1,059,861.
Patented Apr. 22, 1913.
2 SHEETS—SHEET 2.
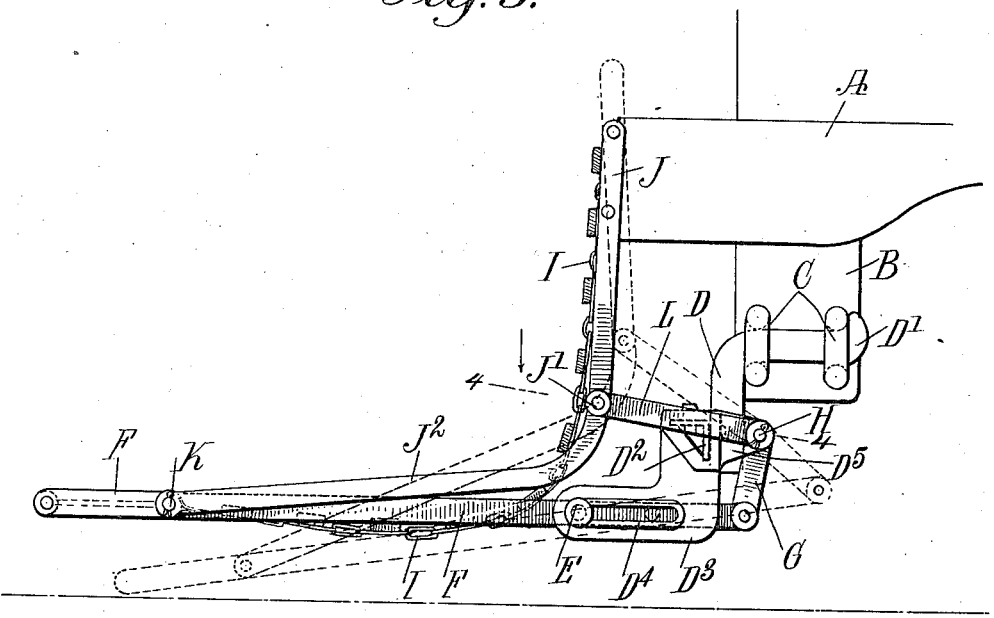
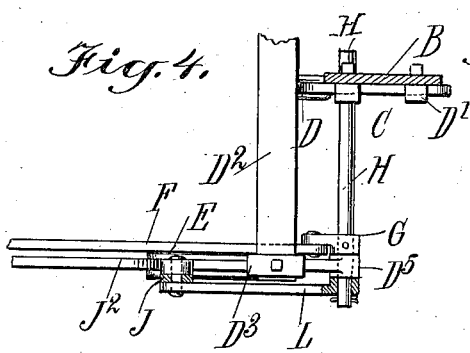
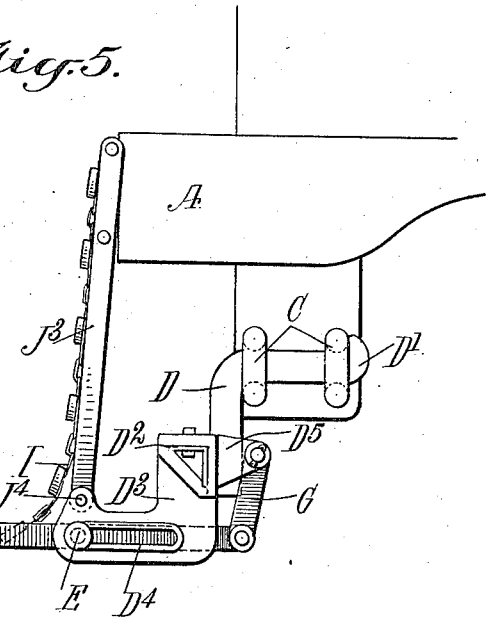
WITNESSES
INVENTORS
John P. Geraghty
George W. Naylor
BY
ATTORNEYS

UNITED STATES PATENT OFFICE.

JOHN P. GERAGHTY AND GEORGE W. NAYLOR, OF JERSEY CITY, NEW JERSEY, ASSIGNORS OF FORTY-FIVE ONE-HUNDREDTHS TO EDWARD C. CURRY AND CHARLES A. STONEHAM, BOTH OF NEW YORK, N. Y.

CAR-FENDER.

1,059,861.      Specification of Letters Patent.      Patented Apr. 22, 1913.

Application filed July 24, 1911. Serial No. 640,073.

*To all whom it may concern:*

Be it known that we, JOHN P. GERAGHTY and GEORGE W. NAYLOR, both citizens of the United States, and residents of Jersey City, in the county of Hudson and State of New Jersey, have invented a new and Improved Car-Fender, of which the following is a full, clear, and exact description.

The invention relates to car fenders, such as shown and described in the Letters Patent of the United States, No. 988,999, granted to us on April 11, 1911.

The object of the present invention is to provide a new and improved car fender for use on street cars and the like and arranged to normally stand a distance above the track so as not to interfere with the switches or the like, or become injured by contact with the track, and to automatically move into a lowermost position when striking a person or other object in its path and safely receive and retain the person and to allow such person to draw an arm or a limb out from under the fender should such arm or limb have passed under the fender at the time the main portion of the body falls into the fender, thus preventing injury, not only to the main body, but its arms and limbs. For the purpose mentioned, use is made of an apron frame mounted to turn and to slide on a support and connected with upwardly-extending links for normally holding the apron frame in an approximately horizontal position. The frame on being moved rearward causes the links to swing rearward past a locking position, to allow a forward portion of the apron frame to swing downward into receiving position.

A practical embodiment of the invention is represented in the accompanying drawings forming a part of this specification, in which similar characters of reference indicate corresponding parts in all the views.

Figure 1:
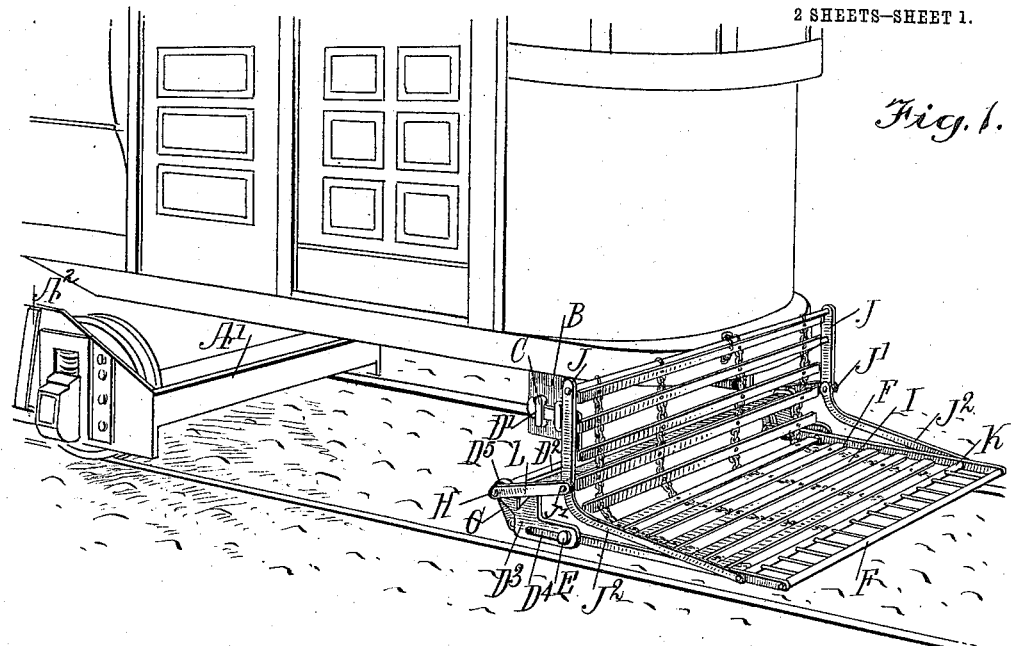
Figure 2:
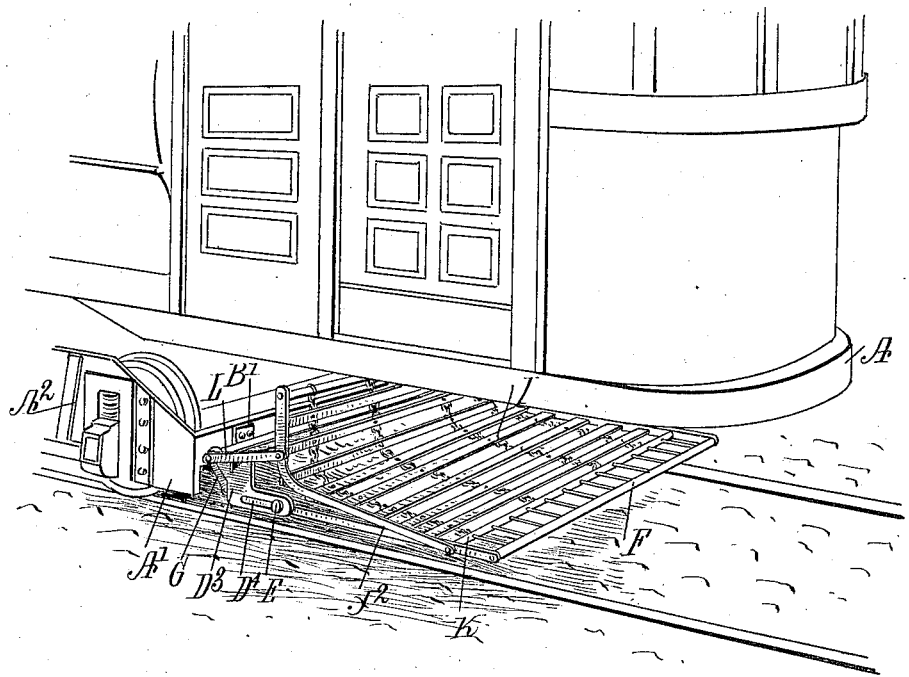

Figure 1 is a perspective view of the car fender as applied to the end of the car to project forward therefrom; Fig. 2 is a like view of the car fender as applied to a car underneath the car platform; Fig. 3 is an enlarged side elevation of the car fender as applied to the front end of a car; Fig. 4 is a sectional plan view of the same on the line 4—4 of Fig. 3; and Fig. 5 is a side elevation of a modified form of the car fender.

On the under side of the platform A of a car, as shown in Figs. 1, 3 and 5, are secured hangers B provided with bearings C engaged by the angular terminals D' of arms D of a support, having a cross bar $D^2$ attached to the arms D. On the ends of the cross bar $D^2$ are secured brackets $D^3$ provided with elongated horizontally-extending slots $D^4$ forming guideways for pivots E secured to the sides of the main apron frame F pivotally connected at the rear ends of its sides with links G extending upwardly and fulcrumed on a transverse rod H supported on rearward extensions $D^5$ of the brackets $D^3$. Normally the links G extend upwardly and rearwardly so as to hold the main apron frame F in an approximately horizontal position, that is, a distance above the car track, to prevent the apron frame from coming in contact with switches and the like. The forward portion of the main apron frame F is connected with the forward end of an apron I of any approved construction, preferably in the form of a slat belt, as indicated in the drawings. The rear upper end of the apron is connected with the upper end of an upright frame J pivotally connected at the lower end by pivots J' with forwardly-extending members $J^2$ pivoted to a cross bar K at the forward end of the main apron frame F. The pivots J' are connected with links L extending rearwardly and fulcrumed on the transverse rod H, on which the locking links G are mounted to swing. Now when the parts are in normal position, as shown in Figs. 1 and 3, the links G hold the main apron F in an approximately horizontal position, and in case the forward end of the device F strikes a person in the path of the car then the apron frame F is caused to slide rearwardly, being guided by its pivots E in the guideways $D^4$ of the brackets $D^3$. The rearward movement of the apron frame F causes a rearward swinging of the links G, so that the latter pass a vertical position and in swinging rearwardly the links G allow the frame F to swing downward at its forward end with the pivots E as fulcrums.

From the foregoing it will be seen that the main apron frame F moves rearwardly and downwardly when striking a person or other object in its path to cause the person or object to readily fall into the apron I to be supported by the latter. Now it will be noticed that when a person falls into the apron at the time the apron frame F is in downward position then such person can readily draw an arm or a limb out from under the front end of the main apron frame F, as the latter is caused to swing slightly upward by the weight of the body exerting a downward pull on the apron I and the frame J, and as the latter is hung on the links L the members $J^2$ move forward and in doing so cause a forward movement of the apron frame F so that the links G swing slightly downward and forward, thus causing the forward end of the apron frame F to rise sufficiently for a person to withdraw the arm or limb in case the same passes under the apron frame at the time the body was falling into the apron I.

In the form shown in Fig. 2, the hangers B' are mounted on the cross beam A' of the car truck A, but otherwise the construction of the device is the same as above described in reference to Figs. 1, 3 and 4.

In the modified form shown in Fig. 5, the frame $J^3$, which carries the upper end of the apron I, is pivotally connected at its lower end at $J^4$ to the brackets $D^3$, and the links L are dispensed with, otherwise the construction of the fender is the same as above described in reference to Figs. 1, 2, 3 and 4.

It is understood that in the modified form shown in Fig. 5, the main apron frame F is not caused to move upward when a body falls into the apron I, but the apron frame F remains in a lowermost position after it is once pushed rearward and swung downward when striking an object in its path.

Having thus described our invention, we claim as new and desire to secure by Letters Patent:

1. A car fender, comprising a support for attachment to a car, an apron frame mounted to swing and to slide on the said support, and upwardly-extending links pivotally connected at their lower ends with the rear end of the said apron frame and pivotally connected at their upper ends to the said support, the said links normally holding the apron frame in an approximately horizontal position but permitting it to swing downwardly upon striking an object.

2. A car fender, comprising a support for attachment to a car, an apron frame mounted to turn and to slide on the said support, upwardly-extending links pivotally connected at their lower ends with the rear end of the said apron frame and pivotally connected at their upper ends to the said support, the said links normally holding the apron frame in an approximately horizontal position, an upright frame, and an apron connecting the said upright frame with the forward end of the said apron frame.

3. A car fender, comprising a support for attachment to a car, an apron frame mounted to turn and to slide on the said support, upwardly-extending links pivotally connected at their lower ends with the rear end of the said apron frame and pivotally connected at their upper ends to the said support, the said links normally holding the apron frame in an approximately horizontal position, an upright frame pivotally connected with the forward portion of the said apron frame, links pivotally connected with the said upright frame and with the said support, and an apron connecting the said upright frame with the front end of the said apron frame.

4. A car fender, comprising a support for attachment to a car, an apron frame mounted to turn and to slide on the said support, upwardly-extending links pivotally connected at their lower ends with the rear end of the said apron frame and pivotally connected at their upper ends to the said support, the said links normally holding the apron frame in an approximately horizontal position, an upright frame pivotally connected with the forward portion of the said apron frame, links pivotally connected with the said upright frame and with the said support, and an apron connecting the said upright frame with the front end of the said apron frame, the axis of the upper ends of the said apron frame links coinciding with the axis of the rear ends of the said upright frame links.

5. In a car fender, a support having slotted brackets, a main frame having pivots working in slots of the brackets, links pivoted to the rear ends of the said frame and to the support, an upright frame, links pivoted to the upright frame and to the main frame, links pivoted to the upright frame and to the support, and an apron having its forward end secured to the main frame and its rear end secured to the upright frame.

In testimony whereof we have signed our names to this specification in the presence of two subscribing witnesses.

JOHN P. GERAGHTY.
GEORGE W. NAYLOR.

Witnesses:
THEO. G. HOSTER,
JOHN P. DAVIS.